United States Patent [19]

Bowers et al.

[11] 4,094,834

[45] June 13, 1978

[54] ABS-FORMALDEHYDE NOVOLAK

[75] Inventors: Lewis H. Bowers, Scotia; Raymond E. Jankowski, Schenectady; John L. Sullivan, Ballston Lake, all of N.Y.

[73] Assignee: Schenectady Chemicals, Inc., Schenectady, N.Y.

[21] Appl. No.: 635,074

[22] Filed: Nov. 25, 1975

Related U.S. Application Data

[62] Division of Ser. No. 492,967, Jul. 26, 1974, Pat. No. 3,944,510.

[51] Int. Cl.² ............... C08K 5/09; C08L 9/02; C08L 55/02; C08L 61/10
[52] U.S. Cl. .................. 260/19 UA; 260/38; 260/846; 260/DIG. 40
[58] Field of Search .......... 260/846, 19 UA, DIG. 40

[56] References Cited

U.S. PATENT DOCUMENTS

| | | | |
|---|---|---|---|
| 2,428,298 | 9/1947 | Spokes et al. | 260/38 |
| 2,684,350 | 7/1954 | Williams | 260/DIG. 40 |
| 3,020,254 | 2/1962 | Less et al. | 260/38 |
| 3,536,783 | 10/1970 | Jeffreys et al. | 260/846 |
| 3,586,735 | 6/1971 | Giller et al. | 260/846 |
| 3,738,948 | 6/1973 | Dunnom | 260/839 |
| 3,817,976 | 6/1974 | Bakul et al. | 260/846 |

OTHER PUBLICATIONS

Encyclopedia of Polymer Science, vol. 1, pp. 436–444.
Encyclopedia of Chemical Technology, vol. 7, 1965, pp. 676, 677, 682, 683, Kirk-Othmer.

*Primary Examiner*—Murray Tillman
*Assistant Examiner*—Arthur H. Koeckert
*Attorney, Agent, or Firm*—Cushman, Darby & Cushman

[57] ABSTRACT

An acrylonitrile-butadiene-styrene terpolymer is added to a phenol formaldehyde novolak to produce a mixture which materially increases the resistance to peelback as compared to the phenol formaldehyde novolak alone when used as a shell process foundry resin.

9 Claims, No Drawings

ABS-FORMALDEHYDE NOVOLAK

This is a division of application Ser. No. 492,967, filed July 26, 1974, now U.S. Pat. No. 3,944,510.

The present invention relates to improved shell process foundry resin binders.

Phenol-formaldehyde novolak resins as is well known in the art are permanently thermoplastic or fusible resins prepared by condensing phenol with formaldehyde under acid conditions using about 0.5 to 1.0 moles, generally about 0.7 to 0.9 moles, of formaldehyde per mole of phenol. The resins are converted to the infusible condition by adding sufficient hexamethylenetetramine for this purpose. Such phenol-formaldehyde novolaks admixed with hexamethylenetetramine are well known, in the foundry industry.

It has now been found that the resistance to peelback of shell process foundry resins containing phenol-formaldehyde novolak resin binders can be improved by incorporating an acrylonitrile-butadiene-styrene (ABS) terpolymer into the novolak. Desirably, the ABS terpolymer is added during the manufacture of the resin. The most desirable time to add the ABS terpolymer is before the novolak is formed. Thus, the ABS terpolymer can be added during distillation, after distillation, after obtaining free formaldehyde or to the phenol before the formaldehyde is added. The latter procedure is preferred. The amount of ABS terpolymer is normally 1 to 10% based on the weight of phenol, preferably between 3 and 8%. Up to 20% of the ABS terpolymer based on the weight of the phenol can be employed with some impairment of properties, particularly in the process of hot coating the sand.

The amount of hexamethylenetetramine is not critical and can be that usually employed to cure novolak resins. Thus, there is normally employed 10 to 18% hexamethylenetetramine, preferably 12 to 15%, based on the weight of the novolak. In place of hexamethylenetetramine there can be used other conventional hardening agents for novolaks, e.g., paraformaldehyde.

Any of the conventional acids and acidic materials employed to prepare novolak resins can be employed as catalysts, e.g., sulfuric acid, oxalic acid, maleic anhydride, sulfamic acid, phenolsulfonic acid, diethyl sulfate, toluenesulfonic acid (usually employed as the commercial mixture of isomers known as TX acid) and phosphoric acid.

While the range of formaldehyde to phenol in the novolak can be within the range mentioned above, it is preferably within the range of 0.7 to 0.83 mole of formaldehyde per mole of phenol with the optimum range being 0.72 to 0.80 mole of formaldehyde per mole of phenol.

The foundry flake resins of the present invention also preferably contain conventional materials such as calcium stearate (a mold lubricant) and salicylic acid usually contained in commercial foundry flake resins. The total amount of ABS-novolak to sand is that conventionally used in the art in making novolak coated sand for use in foundry cores. Usually 2 to 5% of the resin, preferably 2 to 3% based on the weight of the sand is employed.

The use of the ABS polymer with the novolak resin in preparing the shell process foundry resin has the advantage of materially increasing the resistance to peelback.

Peelback is described in *Metalcasting Dictionary* by the American Foundrymen's Society as "a problem in shell molding when, upon inverting the hot pattern plate, an insufficiently cured shell sand layer separates from the pattern, curling away before it can harden for stripping." Essentially, what happens is that coated sand (usually coated with a phenolic novolak and hexamethylenetetramine) is placed against a hot pattern until a desired thickness of cured and partially cured coated sand is built up. When this thickness is reached, the pattern is inverted and the free-flowing, reusable coated sand falls off the pattern and is collected for future use. Underneath this free-flowing layer is a partially cured layer that could peel off the surface. This material is waste and not reusable. The void left in the shell mold wall creates a weak spot and renders the shell mold unusable. Applicants have found that by the addition of one percent of an acrylonitrile-butadiene-styrene (ABS) resin to the novolak, peel back can be minimized if not eliminated.

In order to anticipate the peel back characteristics of a batch of coated sand a quality control peel back test has been developed by the industry (see Example 6). During the summer half of the year (mid-April to mid-October) peel back seems to occur more often. Using the peel back test described in Example 6 it is not uncommon to see 30 weight percent peel back with commercial resins. It must be remembered that this test is quite severe. It does not necessarily follow that a resin which shows 30 percent peel back by the quality control test will show thirty percent peel back in the foundry. Generally speaking, the resins will show a lesser amount of peel back in the foundry. However, this depends on a lot of factors such as configuration of the shell mold, ambient conditions such as temperature and relative humidity, pattern temperature, etc. If the coated sand performs well with respect to peel back during the quality control test, one can be reasonably certain it will perform well in the foundry.

There can be employed commercially available ABS terpolymers, e.g., Dow 500 and Dow 300. Other suitable ABS terpolymers are those identified below as ABSON 820X13, ABSON 820X14, ABSON 820X15 and ABSON 820X16. ABSON 820X14 has a nitrogen content of 6.6% and the other ABSON terpolymers are of somewhat lower nitrogen content. Other properties of the ABSON terpolymers which are available as powders are set forth below.

| ABSON ABS TERPOLYMER RESIN PROPERTIES | | | | |
|---|---|---|---|---|
| | 820X13 | 820x14 | 820X15 | 820X16 |
| Tensile Strength (psi) | 2,900 | 6,200 | 5,500 | 5,800 |
| Ultimate Elongation (%) | 200 | 15 | 3 | 3 |
| Izod Impact Strength | | | | |
| at R.T. | 1.7 | 1.8 | 7.5 | 6.5 |
| at −20° F. | 1.3 | 1.4 | 2.9 | 1.2 |
| at −40° F. | 1.2 | 0.8 | 1.9 | 0.8 |
| Hardness, Rockwell R | 70 | 116 | 103 | 106 |
| Hardness, Shore D | 66 | — | 75 | 73 |
| Heat Deflection Temp. | | | | |
| 264 psi (° F.) | 181 | 203 | 198 | 196 |

-continued
ABSON ABS TERPOLYMER RESIN PROPERTIES

|  | 820X13 | 820x14 | 820X15 | 820X16 |
|---|---|---|---|---|
| Specific Gravity | 0.99 | 1.06 | 1.04 | 1.04 |
| Viscosity, Poises × 10³ | | | | |
| Instron Rheometer (225° C) 437° F. | | | | |
| at 1000 sec⁻¹ | 6.7 | 3.1 | 3.4 | 3.0 |
| at 100 sec⁻¹ | 42 | 15 | 15 | 11 |
| at 10 sec⁻¹ | 270 | 53 | 40 | 23 |
| at 1 sec⁻¹ | 930 | 110 | 80 | 40 |
| Solution Viscosity (Cps)* | | | | |
| Brookfield at 20 RPM | | | | |
| 10% T.S. in THF, Initial | 640 | — | 38 | — |
| 1 Day | 640 | — | 42 | — |
| 30 Days | 584 | — | 50 | — |
| 10% T.S. in MEK, Initial | 9 | — | 10.5 | — |
| 1 Day | 9 | — | 11.5 | — |
| 30 days | 8.5 | — | 10.0 | — |

*Values normalized with correction factors for various spindle sizes.

Unless otherwise indicated, all parts and percentages are by weight.

In the examples DB-31 Antifoam is a polymethylsilane antifoaming agent produced by Dow Corning. Its use is not essential.

Calcium stearate 60% means that the calcium stearate was added as an aqueous dispersion containing 60% solids.

EXAMPLE 1

| A. | C. P. Phenol | 1000.0 Parts |
|---|---|---|
| B. | DB-31 Antifoam | 0.2 Parts |
| C. | Con. Sulfuric Acid | 2.0 Parts |
| D. | Abson 820 X 14 | 50.0 Parts |
| E. | 37% Formalin | 620.0 Parts |
| F. | Salicylic Acid | 50.0 Parts |
| G. | Calcium Stearate 60% | 84.0 Parts |

Components "A" through "D" were loaded into a reaction vessel set for reflux. The components were heated to 115° and held for 15 minutes, during which time the mixture became homogeneous. The heat was removed and component "E" was added dropwise over a 30- to 60-minute period. Enough heat was used to maintain a reflux. After all of component "E" was added, the batch was held at reflux (100° C.) until the free formaldehyde in the refluxate was less than 0.5%. Three hundred parts of distillate were removed. Components "F" and "G" were then added and the resulting material was distilled to a grindable resin.

Ball and Ring Softening Point = 92° C. (ASTM E28-67) Yield = 1205 Parts

EXAMPLE 2

| A. | C. P. Phenol | 1000.0 Parts |
|---|---|---|
| B. | DB-31 Anti foam | 0.2 Parts |
| C. | Con. Sulfuric Acid | 2.0 Parts |
| D. | Abson 820 X 15 | 50.0 Parts |
| E. | 37% Formalin | 620.0 Parts |
| F. | Salicylic Acid | 50.0 Parts |
| G. | Calcium Stearate 60% | 84.0 Parts |

The reaction procedure is the same as in Example 1.
Ball and Ring Softening Point = 104° C. Yield = 1180 Parts

EXAMPLE 3

| A. | C. P. Phenol | 1000.0 Parts |
|---|---|---|
| B. | DB-31 Anti foam | 0.2 Parts |
| C. | Con. Sulfuric Acid | 2.0 Parts |
| D. | Abson 820 X 16 | 50.0 Parts |
| E. | 37% Formalin | 620.0 Parts |
| F. | Salicylic Acid | 50.0 Parts |
| G. | Calcium Stearate 60% | 84.0 Parts |

The reaction procedure is the same as in Example 1.
Ball and Ring Softening Point = 95° C. Yield = 1155 Parts

EXAMPLE 4

| A. | C. P. Phenol | 1000.0 Parts |
|---|---|---|
| B. | DB-31 Anti foam | 0.2 Parts |
| C. | Con. Sulfuric Acid | 2.0 Parts |
| D. | Abson 820 X 13 | 50.0 Parts |
| E. | 37% Formalin | 620.0 Parts |
| F. | Salicylic Acid | 50.0 Parts |
| G. | Calcium Stearate 60% | 84.0 Parts |

The reaction procedure is the same as in Example 1.
Ball and Ring Softening Point = 95° C. Yield = 1150 Parts

EXAMPLE 5 COATING METHOD

| A. | Wedron 70-20 Silica Sand | 11,350.0 Parts |
|---|---|---|
| B. | Resin | 340.0 Parts |
| C. | Hexamethylenetetramine | 48.0 Parts |
| D. | Water | 180.0 Parts |

The following procedure was used to coat the resins prepared in the examples set forth in this application. The coating procedures are well known by those skilled in the art.

1. Material "A" was heated to 170° C. and placed into a Beardsley-Piper Speed muller (25 pound capacity). The sand was allowed to equilibrate to 155° C.
2. With the muller operating the resin was added to the sand. The sand and resin were allowed to mix for 90 seconds.
3. At the end of 90 seconds a solution of "C" and "D" was added to the muller. When the coated sand became free flowing in the muller, it was discharged from the muller and allowed to cool to room temperature. The resulting coated sand was free flowing.

EXAMPLE 6 PEELBACK TEST

Procedure:
1. Heat a hot plate to 450° F. Take the temperature of the hot plate with a pyrometer before each test is run.
2. Weigh 230 gm. of coated sand into a quart can.
3. Pour the sand onto the surface of the hot plate and start a timer. Regulate the invest time so as to produce a test specimen center thickness of ¼ inch. This is done by starting with an arbitrary invest time (e.g.: 15 seconds), measuring the thickness, then increasing or decreasing the invest time until the proper thickness is obtained. Specimen thickness is determined by averaging three thickness gauge measurements taken near the center of the specimen, after it has been removed from the hot plate and cooled.

4. Using the invest time determined in step 3, carry out the peelback test as follows:

5. Weigh and test sand as in step 2 and pour it onto the hot plate. Start the electric timer.

6. After the invest time has elapsed (as determined in step 3), invert the hot plate to remove free-flowing sand.

7. Immediately after inverting (free-flowing sand dumped), place a pan under hot plate to catch coated sand that peels from plate.

8. Return the hot plate to upright position, and take the cured disc from the plate.

9. Record the weight of the disc and peel in pan, in grams.

10. Calculate the percentage weight peelback. For Example:
Core Weight — 400
Peelback Weight — 100
Total Weight — 500
% Weight Peelback — 20%

EXAMPLE 7

The resins in Examples 1 through 4 were tested according to the procedures outlined in Examples 5 and 6.

| Resin | Cold Tensiles (PSI) | % Weight Peelback |
|---|---|---|
| Example 1 | 538 | 0 |
| Example 2 | 512 | 0 |
| Example 3 | 519 | 0 |
| Example 4 | 490 | 0 |

The cold tensile test was according to the procedures outlined in Foundry Core Practice by Harry W. Dietert 3rd Edition 1966, page 224. These values are the results of six dogbone specimens.

EXAMPLE 8

| A. | C. P. Phenol | 1000.0 Parts |
|---|---|---|
| B. | Con. Sulfuric Acid | 6.0 Parts |
| C. | ABSON 820 X 13 | 10.0 Parts |
| D. | 37% Formalin | 649.0 Parts |
| E. | Calcium Stearate 60% | 95.0 Parts |
| F. | Salicylic Acid | 50.0 Parts |

Components "A" through "C" were loaded into a reaction vessel set for reflux. The components were heated to 115 degrees centrigrade and held for 15 minutes, during which time the mixture became homogeneous. The heat was removed and material "D" was added over a 30 to 60-minute period. Enough heat was used to maintain a reflux. After all of component "D" was added, the batch was held at reflux (100° C.) until the free formaldehyde in the refluxate was less than 0.5%. Components "E" and "F" were added and the resulting material was distilled to a grindable resin.

Ball and Ring Softening Point = 94° C. Yield = 1180 Parts

EXAMPLE 9

| A. | C. P. Phenol | 1000.0 Parts |
|---|---|---|
| B. | Con. Sulfuric Acid | 6.0 Parts |
| C. | ABSON 820 X 13 | 50.0 Parts |
| D. | 37% Formalin | 620.0 Parts |
| E. | Calcium Stearate 60% | 95.0 Parts |
| F. | Salicylic Acid | 50.0 Parts |

Procedure the same as Example 8.
Ball and Ring Softening Point = 91° C. Yield = 1200 Parts

EXAMPLE 10

| A. | C. P. Phenol | 1000.0 Parts |
|---|---|---|
| B. | Con. Sulfuric Acid | 6.0 Parts |
| C. | ABSON 820 X 13 | 100.0 Parts |
| D. | 37% Formalin | 620.0 Parts |
| E. | Calcium Stearate 60% | 95.0 Parts |
| F. | Salicylic Acid | 50.0 Parts |

Ball and Ring Softening Point = 93° C. Yield = 1240 Parts

EXAMPLE 11

The resins in Examples 8 through 10 were tested according to the procedures outlined in Examples 5 through 6.

| Resin | Cold Tensiles (PSI) | % Weight Peelback |
|---|---|---|
| Example 8 | 476 | 0.6 |
| Example 9 | 485 | 0.2 |
| Example 10 | 396 | 0.5 |

EXAMPLE 12

| A. | C. P. Phenol | 1000.0 Parts |
|---|---|---|
| B. | Con. Sulfuric Acid | 6.0 Parts |
| C. | ABSON 820 X 13 | 50.0 Parts |
| D. | 37% Formalin | 604.0 Parts |
| E. | Calcium Stearate 60% | 95.0 Parts |
| F. | Salicylic Acid | 50.0 Parts |

Procedure the same as Example 8.
Ball and Ring Softening Point = 92° C. Yield = 1155 Parts

EXAMPLE 13

| A. | C. P. Phenol | 1000.0 Parts |
|---|---|---|
| B. | Con. Sulfuric Acid | 6.0 Parts |
| C. | ABSON 820 X 13 | 50.0 Parts |
| D. | 37% Formalin | 681.0 Parts |
| E. | Calcium Stearate 60% | 95.0 Parts |
| F. | Salicylic Acid | 50.0 Parts |

Procedure the same as in Example 8.
Ball and Ring Softening Point = 92° C. Yield = 1225 Parts

EXAMPLE 14

| A. | C. P. Phenol | 1000.0 Parts |
|---|---|---|
| B. | Con. Sulfuric Acid | 6.0 Parts |
| C. | ABSON 820 X 13 | 50.0 Parts |
| D. | 37% Formalin | 699.0 Parts |
| E. | Calcium Stearate 60% | 95.0 Parts |
| F. | Salicylic Acid | 50.0 Parts |

Procedure the same as in Example 8.
Ball and Ring Softening Point = 109° C. Yield = 1240 Parts

EXAMPLE 15

The resins from Examples 12 through 14 and Example 8 were tested according to the procedures outlined in Examples 5 through 6.

| Resin | Mole Ratio Formaldehyde/phenol | Cold Tensiles PSI | % Weight Peelback |
|---|---|---|---|
| Ex. 12 | 0.70 | 473 | 0.8 |
| Ex. 8 | 0.75 | 485 | 2.3 |
| Ex. 13 | 0.79 | 387 | 0.8 |
| Ex. 14 | 0.81 | Did not coat properly | |

EXAMPLE 16

| A. | C. P. Phenol | 1000.0 Parts |
|---|---|---|
| B. | Con. Sulfuric Acid | 6.0 Parts |
| C. | ABSOn 820 X 13 | 50.0 Parts |
| D. | 37% Formalin | 70.0 Parts |
| E. | 37% Formalin | 550.0 Parts |
| F. | Salicylic Acid | 50.0 Parts |
| G. | Calcium Stearate 60% | 95.0 Parts |

Materials "A", "B" and "D" were added to a reaction vessel set for atmospheric reflux. The batch was heated to atmospheric reflux (100° C.) and material "E" was then added dropwise at reflux over a thirty to sixty-minute period. After all of material "E" was added, the batch was held at reflux until the free formaldehyde in the refluxate was less than one half percent. Materials "C", "F" and "G" were then added to the reaction vessel and the resulting material was distilled to a grindable resin.

Ball and Ring Softening Point = 91° C. Yield = 1195 Parts

EXAMPLE 17

| A. | C. P. Phenol | 1000.0 Parts |
|---|---|---|
| B. | Con. Sulfuric Acid | 6.0 Parts |
| C. | ABSOn 820 X 13 | 50.0 Parts |
| D. | 37% Formalin | 70.0 Parts |
| E. | 37% Formalin | 550.0 Parts |
| F. | Salicylic Acid | 50.0 Parts |
| G. | Calcium Stearate 60% | 95.0 Parts |

Materials "A", "B" and "D" were added to a reaction vessel set for atmospheric reflux. The batch was heated to atmospheric reflux (100° C.) and material "E" was then added dropwise at reflux over a 30 to 60-minute period. After all material "E" was added the batch was held at reflux until the free formaldehyde in the refluxate was less than one half percent. Materials "F" and "G" were added to the reaction vessel and the batch was distilled atmospherically to 130° C. At this time material "C" was added and the resulting material was distilled to a grindable resin.

Ball and Ring Softening Point = 91° C. Yield = 1190 Parts

EXAMPLE 18

| A. | C. P. Phenol | 1000 Parts |
|---|---|---|
| B. | Con. Sulfuric Acid | 6 Parts |
| C. | ABSON 820 X 13 | 50 Parts |
| D. | 37% Formalin | 70 Parts |
| E. | 37% Formalin | 550 Parts |
| F. | Salicylic Acid | 50 Parts |
| G. | Calcium Stearate 60% | 95 Parts |

Materials "A", "B" and "D" were added to a reaction vessel set for atmospheric reflux. The batch was heated to atmospheric reflux (100° C.) and material "E" was added dropwise over a 30 to 60-minute period. After all material "E" was added, the batch was held at reflux until the free formaldehyde in the refluxate was less than one half percent. Materials "F" and "G" were then added and the batch was then distilled to a grindable resin. Material "C" was then added to the molten resin and allowed to mix.

Ball and Ring Softening Point = 94° C. Yield = 1160 Parts

EXAMPLE 19

The resins from Examples 16, 17 and 18 were tested according to the procedure outlined in Examples 5 and 6.

| Resin | Cold Tensiles (PSI) | % Weight Peelback |
|---|---|---|
| Example 16 | 414 | 0 |
| Example 17 | 493 | 7 |
| Example 18 | 457 | 0 |

As is customary in the art, salicylic acid is used in an amount of 2 to 6%, preferably 4% based on the weight of novolak. The calcium stearate also can be used in the customary amount, e.g., 2 to 6%, preferably 4 to 5%, based on the weight of the novolak.

What is claimed is:

1. A composition suitable for use as a shell process foundry flake resin comprising a blend of a phenol-formaldehyde novolak containing 0.70 to 0.83 moles of formaldehyde per mole of phenol and 1 to 20% of an acrylonitrile-butadiene-styrene terpolymer resin based on the phenol in the novolak.

2. A composition according to claim 1, wherein the terpolymer is 1 to 10% of the phenol in the novolak.

3. A composition according to claim 2, wherein the amount of formaldehyde is 0.72 to 0.80 mole per mole of phenol.

4. A composition according to claim 2 including salicylic acid.

5. A composition according to claim 4 including calcium stearate.

6. A process of preparing a composition suitable for coating foundry sand comprising forming a novolak from phenol and formaldehyde in the presence of an acid catalyst, adding an acrylonitrile-butadiene-styrene terpolymer resin in an amount of 1 to 10% of the phenol prior to the completion of the formation of the novolak and adding salicylic acid after formation of the novolak.

7. A process according to claim 6 including the step of adding calcium stearate after formation of the novolak.

8. A composition according to claim 1 which has been made by adding the terpolymer prior to completion of the formation of the novolak.

9. A composition according to claim 8 wherein the terpolymer is 1 to 10% of the phenol in the novolak.

* * * * *